June 5, 1934.   C. B. COTTRELL, 3D   1,961,923
MOTOR FLUID DRIVE FOR RECIPROCATING ELEMENTS
Filed Feb. 27, 1931   2 Sheets-Sheet 1

INVENTOR
Calvert B. Cottrell 3rd
BY
ATTORNEYS

June 5, 1934.　　　　C. B. COTTRELL, 3D　　　　1,961,923
MOTOR FLUID DRIVE FOR RECIPROCATING ELEMENTS
Filed Feb. 27, 1931　　2 Sheets-Sheet 2
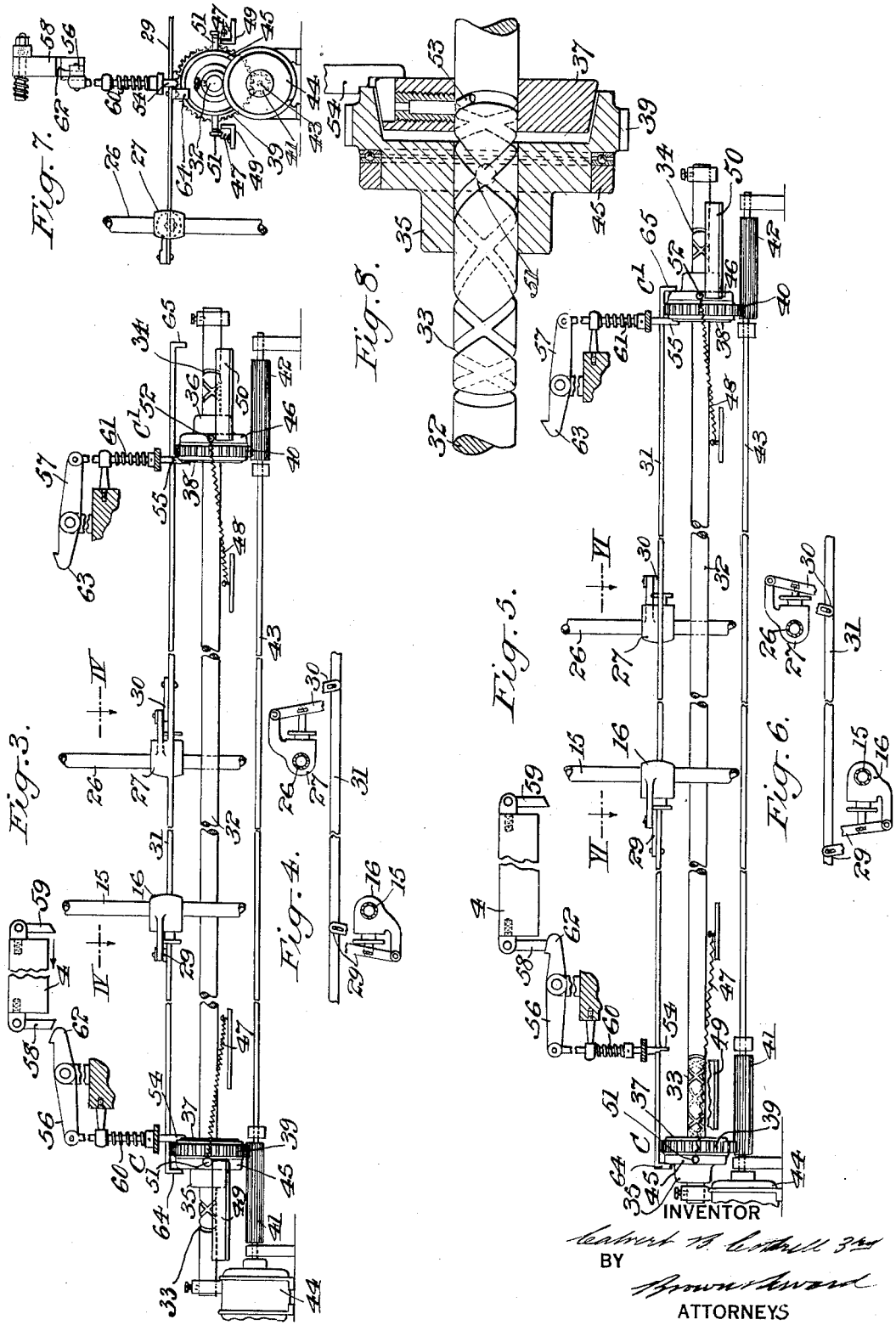
INVENTOR
Cuthbert B. Cottrell 3rd
BY
ATTORNEYS Patented June 5, 1934

1,961,923

UNITED STATES PATENT OFFICE 1,961,923

MOTOR FLUID DRIVE FOR RECIPROCATING ELEMENTS

Calvert B. Cottrell, 3d., Westerly, R. I., assignor to C. B. Cottrell & Sons Company, Westerly, R. I., a corporation of Delaware Application February 27, 1931, Serial No. 518,661

7 Claims. (Cl. 60—52)

One object of my invention is to provide novel motive fluid means for reciprocating an element as, for instance, the bed of a bed and cylinder printing machine, such means comprising generally a complete motive fluid unit for driving the reciprocating element in one direction and another complete motive fluid unit for driving the reciprocating element in the opposite direction.

Another object of my invention is to provide a novel reversing mechanism set in operation by the reciprocating element as it reaches each limit of its movement.

In the use of fluid pressure for reciprocating heavy elements as, for instance, the beds of bed and cylinder printing machines it is necessary to provide means which will quickly bring the reciprocating element up to its required speed after its movement in each direction has been started. This I have found possible to do by providing a separate motive fluid unit for driving the reciprocating element in each direction.

Where the movement of the reciprocating element has been utilized to throw the motive fluid valves over at the ends of the movement of the element, means has to be employed which will throw the valves from the limit of one position to the limit of their other position past their intermediate position where both valves will by-pass. I have accomplished this complete throwing of the valves by providing a separate and novel motor driven reversing mechanism, the operation of which is controlled by the reciprocating element whereby the reversing mechanism is caused to operate as the reciprocating element reaches each limit of its movement.

I have chosen to illustrate my invention in connection with a four revolution bed and cylinder printing machine but it will be understood that the invention is applicable to machines of various kinds wherein an element is to be reciprocated by motive fluid means.

In the accompanying drawings:

Fig. 3 represents a detail side view of the bed reversing mechanism on an enlarged scale, the parts being in the positions they assume as the bed approaches the limit of its movement in one direction;

Fig. 4 represents a detail section taken in the plane of the line IV—IV of Fig. 3, looking in the direction of the arrows;

Fig. 5 represents a detail side view similar to Fig. 3, when the bed has reached a position to release the motive fluid valve reversing device at that end of the machine;

Fig. 6 represents a detail section taken in the plane of the line VI—VI of Fig. 5, looking in the direction of the arrows;

Fig. 7 represents a detail end view of the parts shown in Fig. 3, and

Fig. 8 represents an enlarged detail longitudinal section through one of the valve operating reversing devices.

Figure 2:
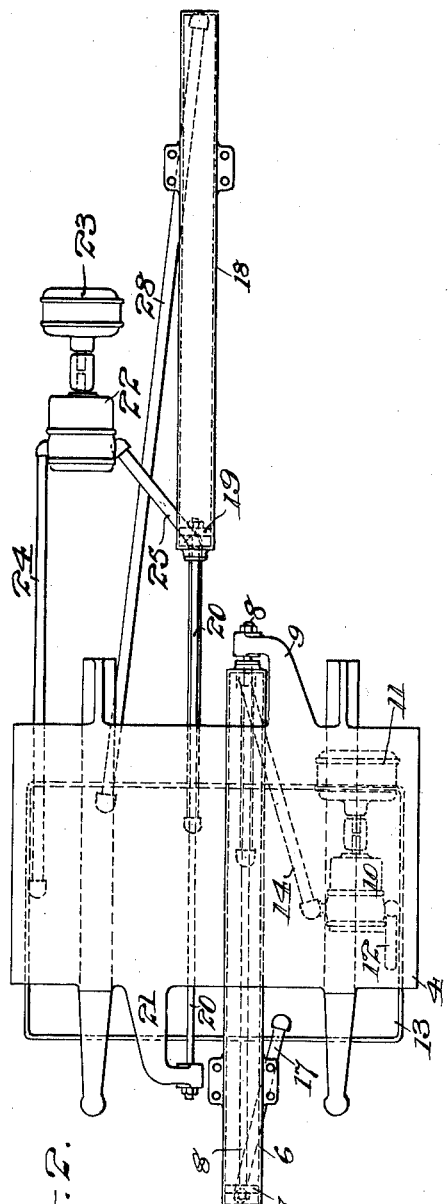
Fig. 2 represents a detail top plan view of the same with some of the parts which are illustrated in Fig. 1, removed.
Figure 1:
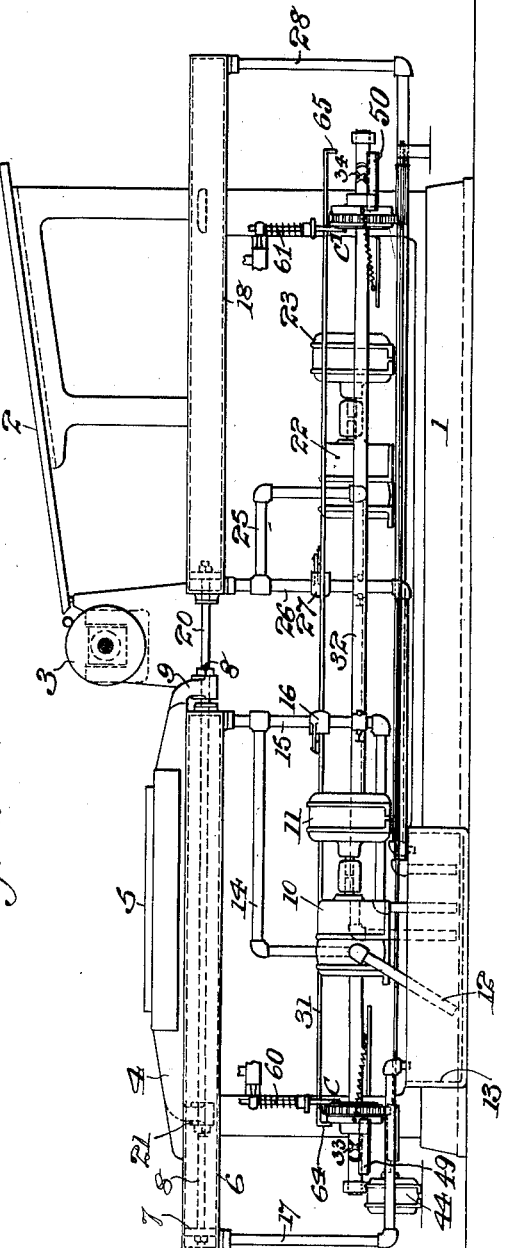
Fig. 1 represents parts of a four revolution bed and cylinder printing press in side elevation with my improved motive fluid drive applied thereto.

The printing machine frame is denoted by 1, the sheet feed table by 2, the impression cylinder by 3, the reciprocating bed by 4 and the form thereon by 5.

The means which I have shown for utilizing a motive fluid such, for instance, as oil for reciprocating the bed is constructed, arranged and operated as follows:

Two alternately operating complete motive fluid units are employed, one for driving the bed in one direction and the other for driving the bed in the opposite direction.

The longitudinally disposed cylinder 6 of one power unit is fixedly mounted in the machine frame below the bed and its piston 7 has its rod 8 attached to an arm 9 projecting from one end of the bed. The motive fluid is forced into the cylinder 6 back of the piston 7 for driving the bed in one direction, by means of a force pump 10 driven by an electric motor 11. A pipe 12 leads from the reservoir 13 to the pump and a pipe 14 leads from the pump to the front end of the cylinder 6. A discharge pipe 15 leads from the front end of the cylinder 6 back to the reservoir 13. A cut-off valve 16 of any well known or approved form is located in the discharge pipe 15, which valve when closed permits the pump 10 through its motive fluid to drive the bed in one direction and which valve when opened permits the bed to be driven in the opposite direction by the other power unit to be immediately described. A pipe 17 leads from the rear end of the cylinder 6 to the reservoir 13, to take care of any of the motive fluid which may escape past the piston 7.

The other power unit comprises a longitudinally disposed cylinder 18 which is fixedly mounted in the machine frame below the bed in a different vertical plane from the cylinder 6. This cylinder 18 is provided with a piston 19, whose rod 20 it attached to an arm 21 projecting from the end of the bed opposite to that from which the arm 9 projects.

The motive fluid is forced into the cylinder 18 back of the piston 19 to drive the bed in the direction opposite to that in which it is driven by the first described power unit. A pump 22 is provided for this purpose, which pump is driven by a suitable electric motor 23. A pipe 24 leads from the reservoir 13 to the pump 22 and a pipe 25 leads from the pump 22 to the rear end of the cylinder 18. A discharge pipe 26 leads from the rear end of the cylinder 18 back to the reservoir 13. A cut-off valve 27 is located in the discharge pipe 26, which valve when closed will cause the pump 22, through its motive fluid, to drive the bed in the opposite direction from that in which it is driven by the pump 10. When this valve 27 is opened it will permit the bed to be driven in its proper direction by the pump 10. A pipe 28 leads from the front end of the cylinder 18 to the reservoir 13.

The bed controlled motor operated bed reversing mechanism is constructed, arranged and operated as follows: The motive fluid valves 16 and 27 are connected by links 29 and 30 respectively to a longitudinally disposed valve shifting rod 31. This rod is moved in one direction by a bed controlled motor operated device C, to open the valve 16 and close the valve 17 to reverse the movement of the bed when it reaches one limit of its movement, and the rod 31 is moved in the opposite direction by a bed controlled motor operated device C', to close the valve 16 and open the valve 27 to reverse the movement of the bed when it reaches the limit of its movement in the opposite direction.

These devices C, C' are mounted for alternate movement along a bar 32 as follows: The devices C, C' are shown in the present instance as clutches, the alternate movements of which are controlled by endless cross grooved portions 33 and 34 in the bar 32. These clutches comprise outer members 35, 36 and inner members 37, 38, the outer members having gears 39, 40 which mesh with wide faced pinions 41, 42 of a longitudinally disposed shaft 43 driven by an electric motor 44. Rings 45, 46 are mounted on the outer clutch members 35, 36, to which rings are attached springs 47, 48, tending to hold the outer clutch members at the limits of their inward movements toward each other. These rings are held against rotary movement by guides 49, 50 which engage their respective pairs of laterally projecting pins 51, 52, to which the springs 47 and 48 are attached. It will thus be seen that the outer clutch members 35, 36 are rotatable on the bar 32 and also in the rings 45, 46.

Each of the inner clutch members 37, 38 is provided with a shoe 53 traveling in its double endless groove 33 or 34, as the case may be. The outer clutch members 35, 36 are normally held out of clutching engagement with their inner clutch members 37, 38 by sliding latches 54, 55, the lower ends of which engage the inner faces of their respective outer and inner clutch members.

The upper ends of these latches are connected to rock levers 56, 57, which are arranged to be alternately engaged by dogs 58, 59, carried by the bed 4. Springs 60, 61 on the latches 54, 55 serve to normally hold the latches at the limit of their downward movement with the noses 62, 63 of the levers 56, 57, raised into the path of the dogs 58, 59 on the bed.

In operation: Presupposing the bed 4 to be approaching the limit of its movement to the left, as indicated in Fig. 3 of the drawings, the discharge valve 16 in the pipe 15 will be closed and the discharge valve 27 in the pipe 26 will be open. This causes the pump 10 to force the motive fluid into the cylinder 6 back of the piston 7 and causes the pump 22 to force the motive fluid through the valve 27 into the reservoir 13. As soon as the bed reaches the position indicated in Fig. 5, the dog 58, carried by the bed, depresses the nose 62 of the latch lever 56, thereby rocking the lever to lift the latch 54 out of its engagement with the members 35, 37 of the clutch C. This will permit the springs 47 to draw the revolving clutch member 35 into engagement with the clutch member 37, causing it to also revolve. The two clutch members will then travel outwardly along the bar 32 because of the engagement of the shoe 53, carried by the clutch member 37, with the endless cross groove 33. This clutch C during its outward movement will engage an abutment 64 on one end of the rod 31 and positively move the rod endwise sufficiently to fully open the discharge valve 16 and close the discharge valve 27. This will reverse the movement of the bed by causing the pump 22 to force the motive fluid into the cylinder 18 back of the piston 19 and by causing the pump 10 to force the motive fluid back into the reservoir through the open discharge valve 16.

It will readily understood that this same proceeding will be repeated with the other clutch C' when the bed reaches the limit of its movement in that direction because of the engagement of the clutch with an abutment 65 on the other end of the rod 31.

In the meantime the first described clutch C will be returned to its original position, indicated in Fig. 3, it being understood that the clutch members are released by the engagement of the outer clutch member 35 with the latch 54 just before the engagement of the inner clutch member 37 with said latch.

From the above description it will be seen that I have provided novel means whereby a complete motive fluid unit is used for driving the bed in one direction and another complete motive fluid unit is used for driving the bed in the opposite direction.

It will also be seen that I have provided a novel reversing mechanism for the bed, said mechanism including two motor operated reversing devices operable by a very rapid movement to positively open one of the discharge valves and simultaneously close the other of the discharge valves of the bed driving motive fluid units.

It is evident that various changes may be resorted to in the construction, form and arrangement of the several parts without departing from the spirit and scope of my invention, and hence I do not intend to be limited to the particular embodiment herein shown and described, but

What I claim is:—

1. An element and means for reciprocating it, a motor, an element reversing mechanism driven thereby and operated by said element as it approaches the limits of its movements, said element reversing mechanism including a longitudinally disposed bar having two endless crossed groove portions and two clutches mounted for longitudinal movement of said bar, each clutch comprising a motor driven member and a member engaging said groove portion, and means operated by the element for releasably holding the clutch members apart.

2. An element, means for reciprocating it, comprising two power units, each including a motor and a motive fluid pump driven thereby, a third motor, an element reversing mechanism driven thereby and operated by said element as it approaches the limits of its movements, said reversing mechanism including a longitudinally disposed bar having two endless crossed groove portions and two clutches mounted for longitudinal movement of said bar, each clutch comprising a motor driven member and a member engaging said groove portion, and means operated by the element for releasably holding the clutch members apart.

3. An element and means for reciprocating it, a motor, an element reversing mechanism driven thereby and operated by said element as it approaches the limits of its movements, said element reversing mechanism including a longitudinally disposed bar having two endless crossed groove portions and two clutches mounted for longitudinal movement of said bar, each clutch comprising a motor driven member and a member engaging said groove portion, a latch operated by the element for releasably holding the clutch members apart, and a spring tending to bring the clutch members together.

4. An element, means for reciprocating it, comprising two power units, each including a motor and a motive fluid pump driven thereby, a third motor, an element reversing mechanism driven thereby and operated by said element as it approaches the limits of its movements, said reversing mechanism including a longitudinally disposed bar having two endless crossed grooved portions and two clutches mounted for longitudinal movement of said bar, each clutch comprising a motor driven member and a member engaging said groove portion, a latch operated by the element for releasably holding the clutch members apart, and a spring tending to bring the clutch members together.

5. An element, means for reciprocating it comprising two cylinders, their pistons, two motors, two pumps driven thereby, cylinder inlet passages leading from the pumps, and valved discharge passages leading from the cylinders, a discharge valve shifting rod, a third motor and two clutches driven thereby for shifting the rod to alternately open and close said discharge valves, said clutches being alternately operated by said reciprocating element at it approaches the limits of its movements.

6. An element, means for reciprocating it comprising two cylinders, their pistons, two motors, two pumps, driven thereby, cylinder inlet passages leading from the pumps and valved discharge passages leading from the cylinders, a discharge valve shifting rod, a fixed bar having endless crossed grooved portions, a third motor and two clutches driven thereby and mounted for endwise movement on the bar and engaged with their respective crossed grooved portions for shifting the rod to alternately open and close said discharge valves, said clutches being alternately operated by said reciprocating element as it approaches the limits of its movements.

7. An element and means for reciprocating it, comprising two power units, each power unit including a cylinder, its piston, a motor and a motive fluid pump driven thereby, said cylinder being in open communication with the pump and having a valved discharge passage and said pump being arranged to force motive fluid into the cylinder when the discharge passage valve is closed or through the discharge passage when the valve is opened, a third motor and an element reversing mechanism driven thereby and operated by said element as is approaches the limits of its movements for alternately opening and closing each of said discharge passage valves.

CALVERT B. COTTRELL, 3RD.